No. 860,735. PATENTED JULY 23, 1907.
P. A. CUSTER.
STEERING GEAR.
APPLICATION FILED OCT. 18, 1906.
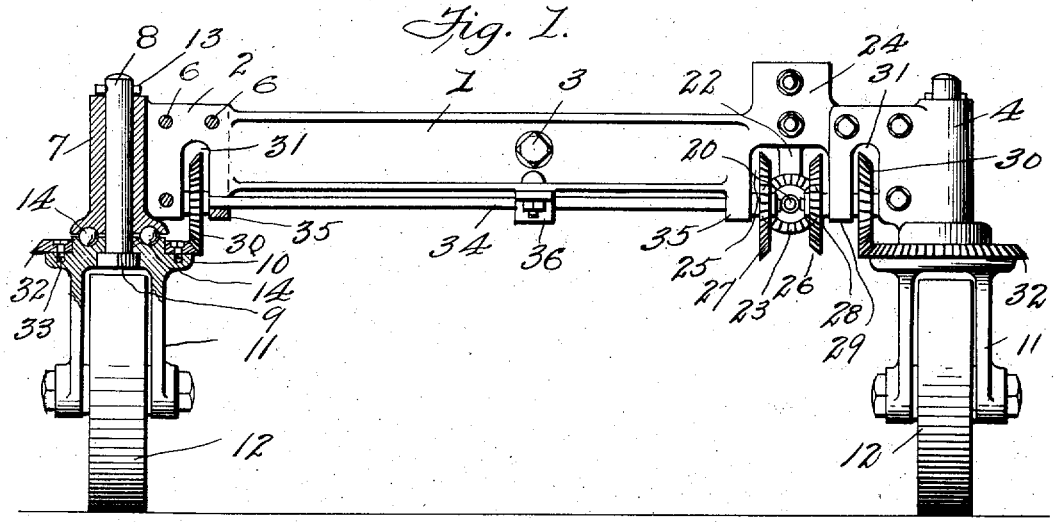
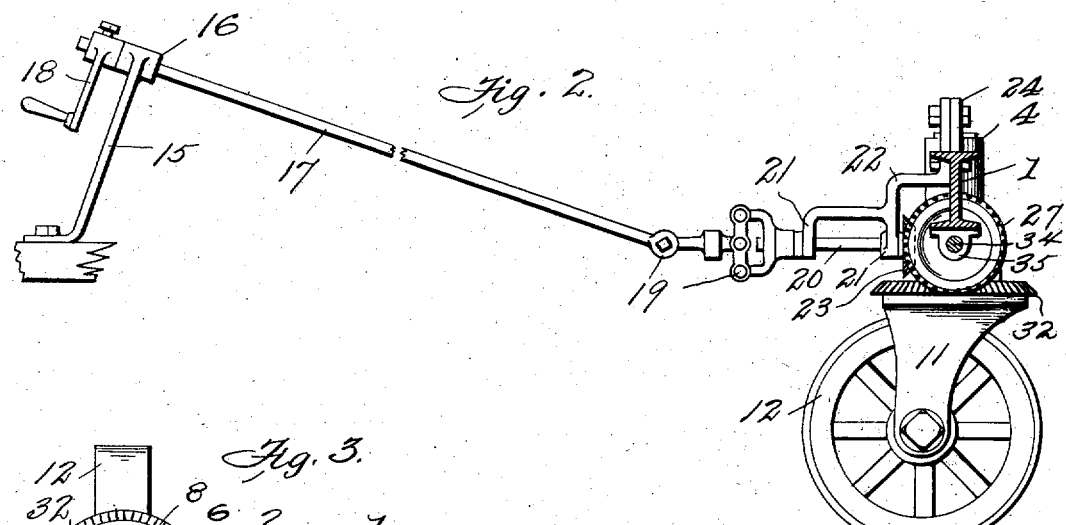
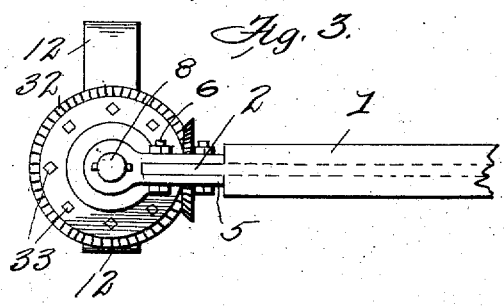
Witnesses
Chas. K. Davis.
Johns Powers
Inventor
P. A. Custer
By Shepherd & Parish
Attorney

UNITED STATES PATENT OFFICE.

PETER A. CUSTER, OF MANCHESTER, ILLINOIS.

STEERING-GEAR.

No. 860,735.  Specification of Letters Patent.  Patented July 23, 1907.

Application filed October 18, 1906. Serial No. 339,488.

*To all whom it may concern:*

Be it known that I, PETER A. CUSTER, a citizen of the United States, residing at Manchester, in the county of Scott and State of Illinois, have invented certain new and useful Improvements in Steering-Gears, of which the following is a specification.

This invention relates to new and useful improvements in steering gears for automobiles and it particularly pertains to a mechanism for directly turning the front wheels.

The invention in its specific application is designed for use on traction engines and heavy farm machinery and aims primarily to provide a steering mechanism so connected with the wheels of the vehicle that the latter will travel in a direct line should the steering mechanism become broken or out of control.

The invention aims as a further object to provide a steering mechanism embodying means for compensating for the inequalities of the ground with respect to the travel of the steering wheels.

The invention aims as a further object to provide a device of the type set forth which shall be simple in construction, inexpensive to manufacture and practical and efficient in use.

The detailed construction will appear in the course of the following description in which reference is had to the accompanying drawings forming a part of this specification, like numerals designating like parts throughout the several views, wherein Figure 1 is a front elevation partly in section of a steering mechanism constructed in accordance with invention. Fig. 2 is a side elevation thereof partly in section, and Fig. 3 is a fragmentary top plan view.

Referring specifically to the accompanying drawings the numeral 1 designates a transverse I-beam provided at its end with web extensions 2 indicated in Figs. 1 and 3, the beam 1 being pivotally suspended by a centrally located king bolt 3 from the frame of the machine. Secured to the web extensions 2 are brackets 4 provided with spaced parallel enlarged ears 5 which overlap said extension and through which pass connecting bolts 6. The brackets 4 each comprise an integral vertical sleeve 7 for the reception therethrough of the spindle 8 of the steering wheels, the latter being in the nature of a caster. The spindle 8 is provided with an enlarged head 9 projecting through the upper end of a bracket head 10, the latter being provided with depending legs 11 between which the traction wheel 12 is carried upon a suitable shaft not shown. The spindle 8 is held from displacement from the sleeve 7 by a cotter 13. In its rotatable disposition with relation to the sleeve 7, spherical thrust bearings 14 are interposed between the head 10 and the lower portion of the sleeve 7 in suitable ways provided therefor as will be readily understood.

The above description relates to the construction and manner of mounting the steering wheels *per se* in connection with which novel means are employed for rotating said wheels upon the spindles 8 as an axis. Disposed rearwardly of the beam 1 upon the frame of the machine is a vertically extending arm 15 provided with an inclined sleeve 16 which serves as a supporting bearing for an inclined shaft 17 rotated by a detachable crank 18. The shaft 17 has connection at its end by a double pivot universal joint mechanism 19 with a horizontal shaft 20 supported between depending arms 21 of a bracket 22, the latter being carried by the frame 1 rearwardly thereof. The shaft 20 carries at its outer end a bevel pinion 23 which serves as the master gear of the steering apparatus. It should be noted that the beam 1 is provided with a vertical extension 24 upon which the bracket 22 is secured and beneath said extension said beam is cut away as at 25, to accommodate the pinions 26 and 27. The pinion 26 is carried upon the end of a stub shaft 28 the latter being journaled in integral bearings 29 provided therefor upon the bracket 4. The shaft 28 carries at its inner end a pinion 30 which works in a recess 31 formed conjointly between the ears 5 and the extension 2. The pinion 30 directly engages a crown wheel 32 rigidly secured to the head 10 by screws 33 as is shown in Fig. 1. The pinion 27 is carried upon the inner end of an elongated transverse shaft 34 journaled in bearings 35 provided upon the beam 1 and reinforced by a central strap bearing 36. The steering mechanism above described is applicable to both wheels and comprises the pinion 30 and the crown wheel 32.

It will be readily understood that owing to the fact that the beam 1 is incapable of a horizontal swinging motion with relation to the frame, the wheels 12 will always be maintained in alinement with the line of force of the driving wheel, irrespective of the position which said wheels 12 may have upon the spindle 8. Accordingly if any of the steering apparatus should become broken or disarranged, so as to be incapable of manual control, the vehicle will be driven in a straight path until the driving motor is stopped. In practical use the handle 18 is rotated in either direction to impart corresponding movement through the system of gearing described to the wheels 12 upon the spindles 8 as axis. This arrangement is especially advantageous in connection with farming machinery since it permits of the mechanism serving the dual function of a steering and short turning gear.

While the elements herein shown and described are well adapted to serve the functions set forth, it is obvious that various minor changes may be made in the proportions, shape and arrangement of the several parts without departing from the spirit and scope of the invention as defined in the appended claims.

Having fully described my invention I claim:

A steering mechanism comprising a supporting beam, caster wheels journaled therein and rotatable about a vertical axis, and mechanism for imparting simultaneous rotation to said caster wheels upon said vertical axis comprising a hand rotated shaft; a master bevel pinion carried thereby, secondary transverse shafts, pinions carried on each end thereof, the innermost of said pinions being in mesh with said master pinion, crown wheels carried by said caster wheels, the outermost of said pinions being in mesh with said crown wheels.

In testimony whereof I affix my signature in presence of two witnesses.

PETER A. CUSTER.

Witnesses:
CHAS. E. THADY,
BIDA GREENWALT.